US007607639B2

(12) United States Patent
Chen et al.

(10) Patent No.: US 7,607,639 B2
(45) Date of Patent: Oct. 27, 2009

(54) VALVE STRUCTURE

(76) Inventors: Jui-Chien Chen, No.366, Sec. 4, Luhe Rd., Lugang Township, Changhua County (TW); Jui-Ching Chen, No.366, Sec. 4, Luhe Rd., Lugang Township, Changhua County (TW)

(*) Notice: Subject to any disclaimer, the term of this patent is extended or adjusted under 35 U.S.C. 154(b) by 421 days.

(21) Appl. No.: 11/539,692

(22) Filed: Oct. 9, 2006

(65) Prior Publication Data

US 2008/0083898 A1 Apr. 10, 2008

(51) Int. Cl.
*F16K 5/10* (2006.01)

(52) U.S. Cl. .................. 251/208; 251/205; 137/625.31

(58) Field of Classification Search ................ 251/208, 251/205, 304; 137/625.3, 625.31
See application file for complete search history.

(56) References Cited

U.S. PATENT DOCUMENTS 4,205,822 A * 6/1980 Bernat ........................ 251/208
5,042,529 A * 8/1991 Yeh ....................... 137/625.31
5,094,258 A * 3/1992 Orlandi .................. 137/454.5
5,107,884 A * 4/1992 Orlandi .................. 137/454.5
5,190,077 A * 3/1993 Pawelzik et al. ....... 137/625.46
5,402,827 A * 4/1995 Gonzalez .............. 137/625.17
5,918,626 A * 7/1999 Strong et al. ............ 137/454.5
6,279,605 B1 * 8/2001 Wang ..................... 137/454.6
6,845,917 B1 * 1/2005 Chen ........................ 236/12.1
2005/0151106 A1 * 7/2005 He ............................ 251/208

* cited by examiner

*Primary Examiner*—John K Fristoe, Jr.
*Assistant Examiner*—Marina Tietjen
(74) *Attorney, Agent, or Firm*—Egbert Law Offices PLLC

(57) ABSTRACT

The present invention provides a rotary valve structure, which has a rotary water passage structure including a switching component and fixed hole. A first water-guide portion and second water-guide portion are placed laterally onto the switching component, whilst a first punch hole and second punch hole are placed separately onto the fixed hole. A coupling portion is placed between the first water-guide portion and second water-guide portion of the switching component. When the first water-guide portion and second water-guide portion of the switching component are placed opposite to the first punch hole and second punch hole of the fixed hole respectively, the first punch hole and second punch hole form a through-flow structure that prevents water from contacting the metal portions of the housing.

1 Claim, 5 Drawing Sheets

20 10 21 31 30 11 43 54 40 41 42 53 51 50 52 32 35 34 33

VALVE STRUCTURE

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to a structure of a valve, and more particularly to an innovative valve structure with a flow passage preventing exposure of the metal components of the housing to water.

2. Description of Related Art Including Information Disclosed Under 37 CFR 1.97 and 37 CFR 1.98.

Water valves typically have different structures depending upon the structure of water taps. FIG. 1 depicts a rotary valve structure, which comprises a housing 01, a water inlet 02 at a bottom of the housing 01, and a water outlet 03 mounted laterally onto housing 01. At the inner water passage, a switching component 05 and a fixed hole 06 made of ceramics are controlled by a shaft 04 for rotary laminated control. A V-shaped flow passage 07 is placed symmetrically at both sides of the switching component 05, whereas two sectorial punch holes 08 are placed over fixed hole 06 opposite to the V-shaped flow passage 07. The housing 01 is generally made of copper or other electroplating metal materials. Within such a valve structure, the water flowing through housing 01 easily contacts the metal surface, possibly generating copper rust or other toxic foreign materials. The valve structure is commonly used for a water outlet control of a drinking machine, such that poor water quality is likely and poses a health hazard to the human body.

Thus, to overcome the aforementioned problems of the prior art, it would be an advancement in the art to provide an improved structure that can significantly improve efficacy.

To this end, the inventor has provided the present invention of practicability after deliberate design and evaluation based on years of experience in the production, development and design of related products.

BRIEF SUMMARY OF THE INVENTION

In the valve structure of the present invention, water flows into a first through hole 51 of stationary base 50, and then flows through a first punch hole 41, first water-guide portion 32, coupling portion 35, second water-guide portion 33, second punch hole 42 and second through hole 52. Given the fact that stationary base 50 is made of non-metal materials, and the switching component 30 and fixed hole 40 are made of ceramic materials, water flowing through the valve will not contact any metal surface, such that the water can be free from any contamination, especially for water from drinking water machines.

Unlike typical structure with the water inlet placed at a bottom of housing and the water outlet placed laterally onto housing, the valve structure of the present invention has a unique configuration. An external ring surface of the housing maybe a sealed structure, saving manufacturing costs without additional water flow groove.

The valve structure of the present invention is an innovative valve with either a rotary control structure or a triggering control structure for the water inlet and outlet, which caters to different customer needs.

Although the invention has been explained in relation to its preferred embodiment, it is to be understood that many other possible modifications and variations can be made without departing from the spirit and scope of the invention as hereinafter claimed.

DETAILED DESCRIPTION OF THE INVENTION

The features and the advantages of the present invention will be more readily understood upon a thoughtful deliberation of the following detailed description of a preferred embodiment of the present invention with reference to the accompanying drawings.

Figure 1:
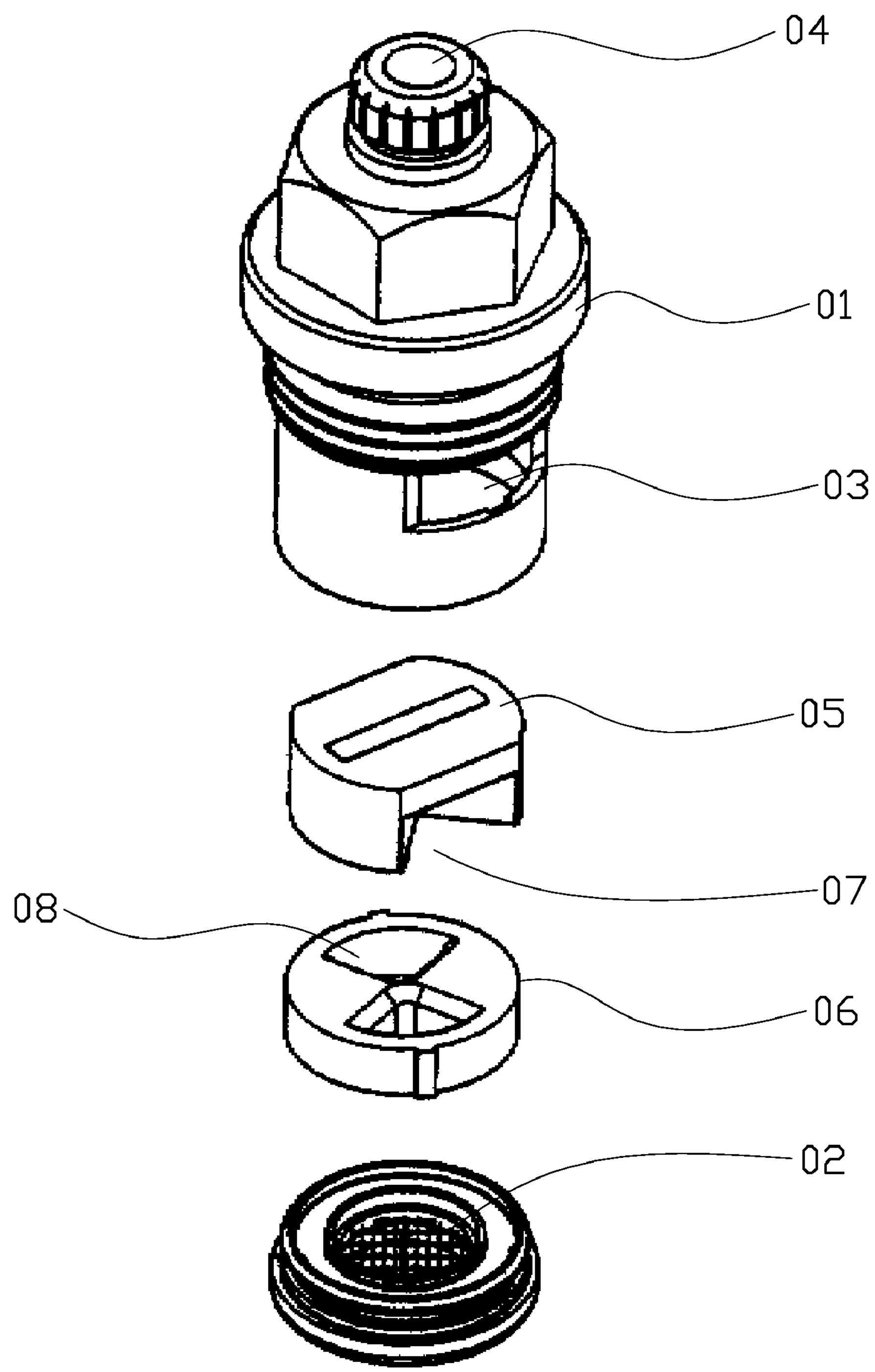
FIG. 1 shows an exploded perspective view of typical valve structure.
Figure 2:
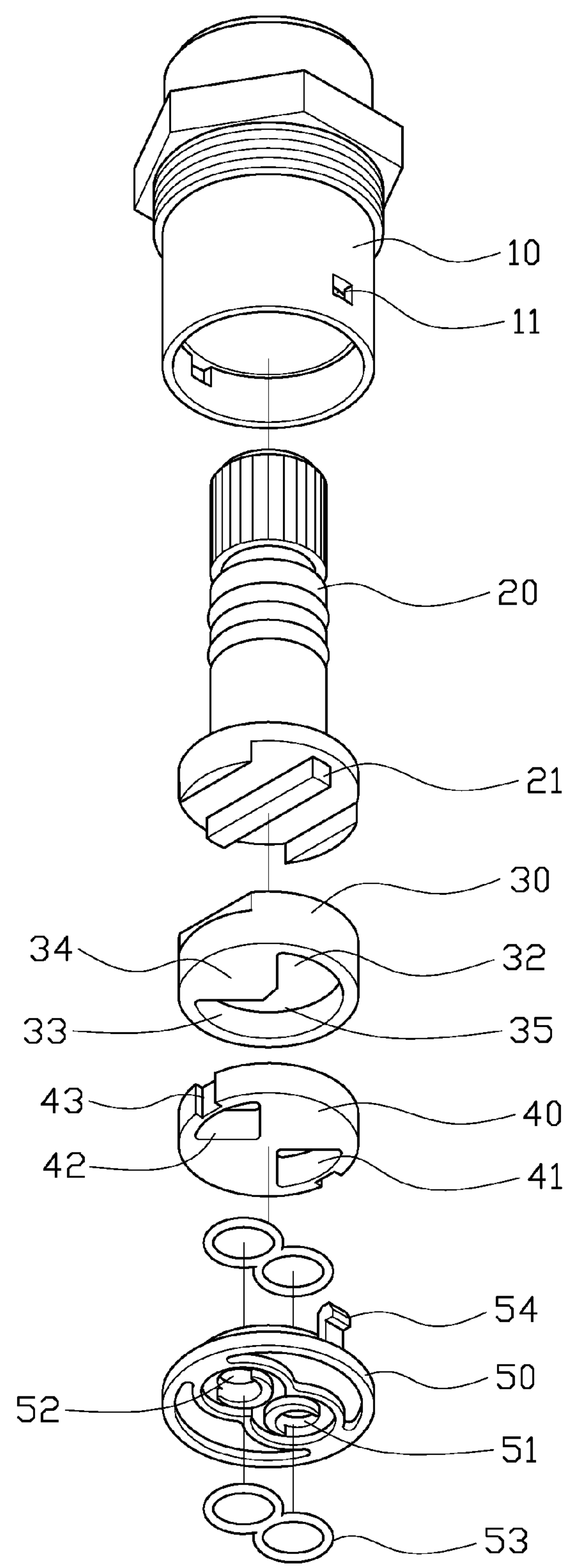
FIG. 2 shows an exploded perspective view of a valve structure of the present invention.
Figure 3:
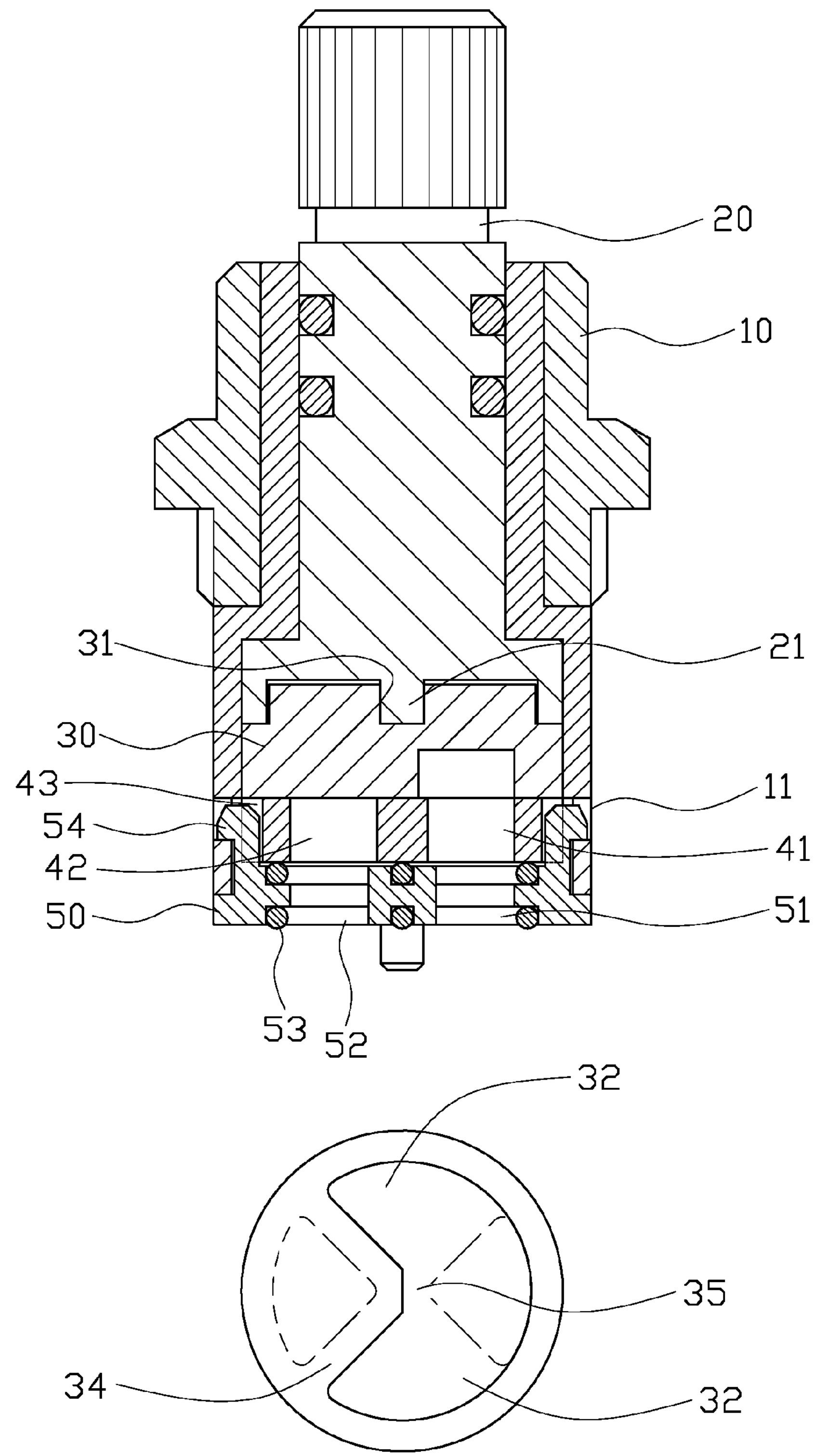
FIG. 3 shows an assembled sectional view of the valve structure of the present invention.
Figure 4:
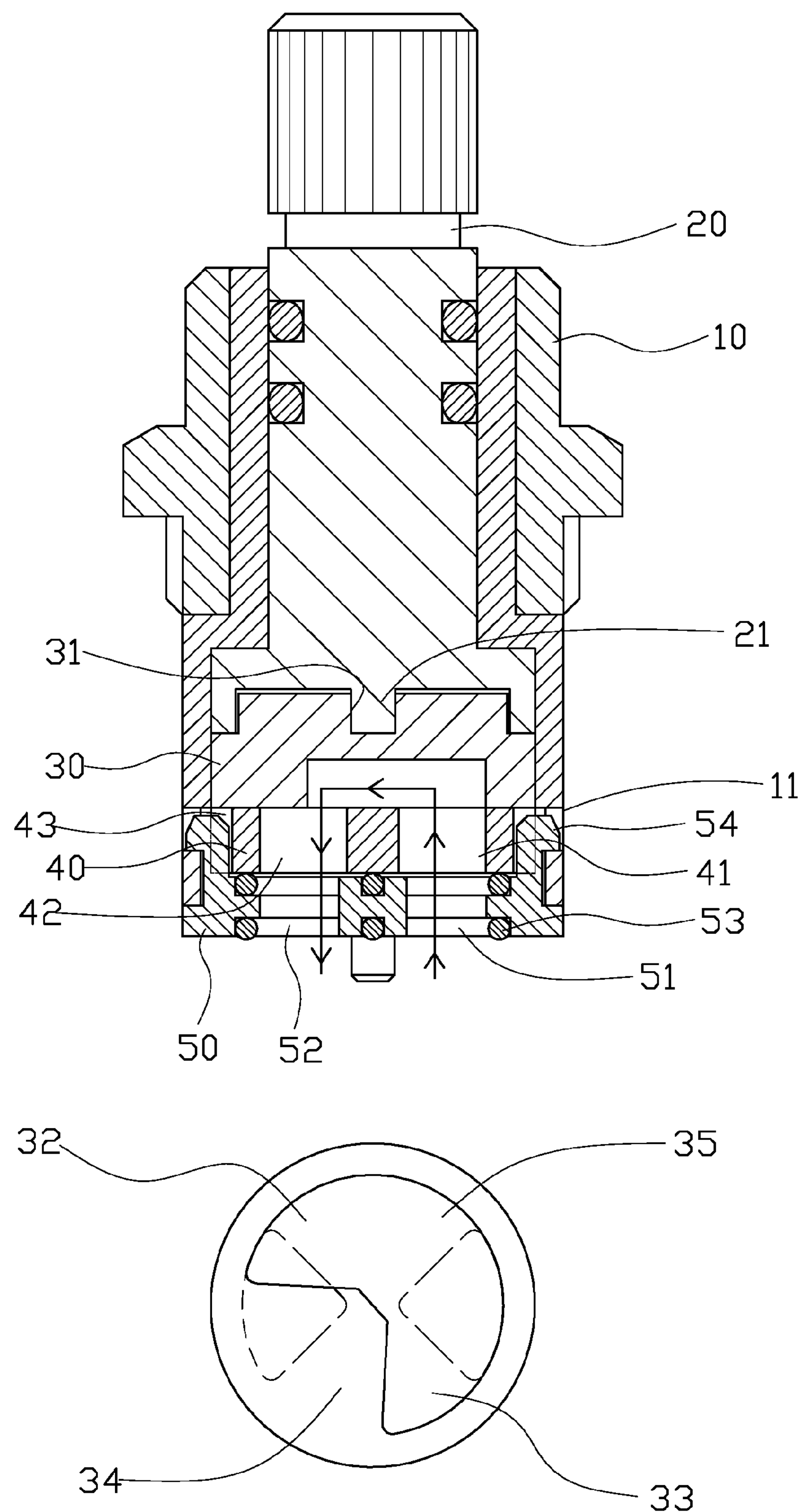
FIG. 4 shows another assembled sectional view of the valve structure of the present invention.

FIGS. 2, 3, and 4 depict the preferred embodiments of valve structure of the present invention. These embodiments are provided only for explanatory purposes. The scope of the invention is determined by the claims.

The present invention comprises a housing 10, which is a hollow cylinder with a snapping hole 11 set at both sides of the bottom of the external ring surface.

A control shaft 20 is axially placed into the housing 10. A top of the shaft 20 protrudes from the housing 10 as a control switch, and a bottom of the shaft 20 is fitted with a filler rod 21.

A switching component 30, made of ceramic materials, is placed within the housing 10. At one side of the switching component, a caulking groove 31 is placed to allow embedding into the filler rod 21 at the bottom of the control shaft 20. At the other side, sectorial first water-guide portion 32 and second water-guide portion 33 are spaced to form a sealed compartment 4.

A fixed hole 40, made of ceramic materials, is coupled to the switching component 30. At the surface of the fixed hole, a sectorial first punch hole 41 and second punch hole 42 are positioned separately in relation to first water-guide portion 32 and second water-guide portion 32 of switching component 30. A locating slot 43 is placed separately at both sides of its outer flange.

A stationary base 50 is mounted tightly onto one end of housing 10 for positioning internal parts. At its surface, a first through hole 51 and through hole 52 are placed opposite the first punch hole 41 and second punch hole 42 of the fixed hole 40. A splayed watertight gasket 53 is placed at a top and bottom of stationary base 50, while a snapper 54 is separately placed at both sides of the top flange. When stationary base 50 is installed, snapper 54 can pass through locating slot 43 at both sides of the fixed hole 40, making it fixed into the snapping hole 11 of housing 10. The watertight gasket 53 at the top of stationary base 50 can reach the bottom of fixed hole 40.

Figure 5:
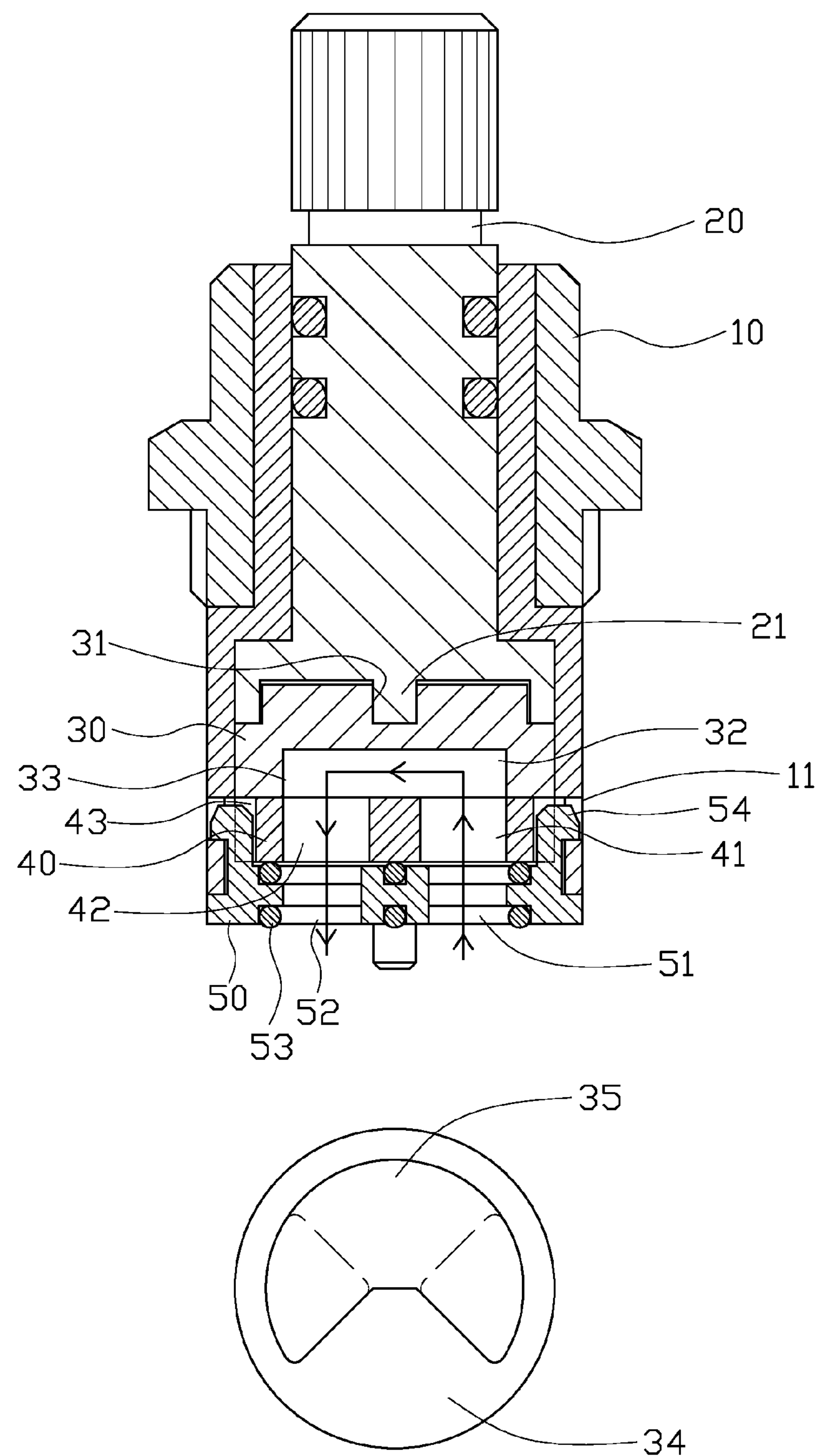
FIG. 5 shows still another assembled sectional view of the valve structure of the present invention.

The first water-guide portion 32 and second water-guide portion 33 of switching component 30 are linked by a coupling portion 35, forming a sectorial groove over 180°. When water flow is closed, the recessed space formed by first water-guide portion 32, second water-guide portion 33 and coupling portion 35 does not cover the first punch hole 41 and second punch hole 42. In such a case, the sealed compartment 34 covers the second punch hole 42. If control shaft 20 is rotated, the switching component 30 will drive the second water-guide portion 32 to cover the second punch hole 42, as illustrated in FIG. 4. The first punch hole 41 is linked with second punch hole 42 via first water-guide portion 32, coupling portion 35 and second water-guide portion 33. Water from first through hole 51 of stationary base 50 can flow through the first punch hole 41, first water-guide portion 32, coupling portion 35, second water-guide portion 33, second punch hole 42 and second through hole 52. The water flow is at a maximum state when the second water-guide portion 33 fully covers the second punch hole 42, as illustrated in FIG. 5. Thus, the present invention has provided a new structure of a valve for rotary water control, with the improved efficiency.

In the valve structure of the present invention, water flows into first through hole 51 of stationary base 50, then flows through the first punch hole 41, first water-guide portion 32, coupling portion 35, second water-guide portion 33, second punch hole 42 and second through hole 52. Given that stationary base 50 is made of non-metal materials, and tha switching component 30 and fixed hole 40 are made of ceramic materials, water flowing through the valve will not contact any metal surface, such that the water can be free from any contamination, especially water from a drinking water machine.

The enhanced efficacy of the present invention is because the valve structure of the present invention has a unique configuration with a straight-through water inlet and outlet. So, the external ring surface of the housing 10 may be a sealed structure, making it possible to save manufacturing costs without an additional water flow groove.

The enhanced efficacy of the present invention is also because the valve structure of the present invention has provided an innovative valve with either a rotary control structure or a triggering control structure for the water inlet and outlet, thus catering to different customer needs.

We claim:

1. A valve apparatus comprising:

a hollow cylindrical housing having an external ring surface, said external ring surface having a snapping hole formed on opposite sides thereof;

a control shaft extending axially into said housing, said control shaft having a top end extending outwardly of a top of said housing so as to form a control switch, said control shaft having a bottom fitted with a filler rod;

a switching component formed of ceramic material, said switching component positioned in said housing, said switching component having a groove formed on an upper side thereof so as to receive said filler rod therein, said switching component having a sectorial first water guide portion and a sectorial second water guide portion in spaced and sealed relation;

a fixed hole member formed of ceramic material, said fixed hole member being coupled to said switching component, said fixed hole member having a sectorial first punch hole and a sectorial second punch hole formed opposite to each other said fixed hole member having a locating slot formed on opposite sides of an outer periphery thereof;

a stationary base fixedly mounted onto one end of said housing, said stationary base having a first through hole and a second through hole formed therein so as to be respectively aligned with said first punch hole and said second punch hole of said fixed hole member, said stationary base having a splayed watertight gasket positioned on a top and a bottom thereof, said stationary base having a snapper extending upwardly on opposite sides thereof, said snapper extending through said locating slot of said fixed hole member and engaging said snapping hole of said housing, said watertight gasket at said top of said stationary base forming a seal with a bottom of said fixed hole member, said first water guide portion and said second water guide portion being linked by a coupling portion so as to form a sectorial groove extending for more than 180°, said control switch being rotatable to a closed water flow position in which a recessed space formed by said first and second water guide portions and said coupling portion does not cover both of said first and second punch holes and said sealed compartment covers said second punch hole, said control switch being rotatable to another position such that said switching component drives said second water guide portion so as to cover said second punch hole such that said first punch hole is linked to said second punch hole by said first water guide portion and said coupling portion and said second water guide portion.

* * * * *